Feb. 9, 1937.  A. I. ENGEL ET AL  2,069,824
COOKING DEVICE
Filed May 1, 1936  2 Sheets-Sheet 1
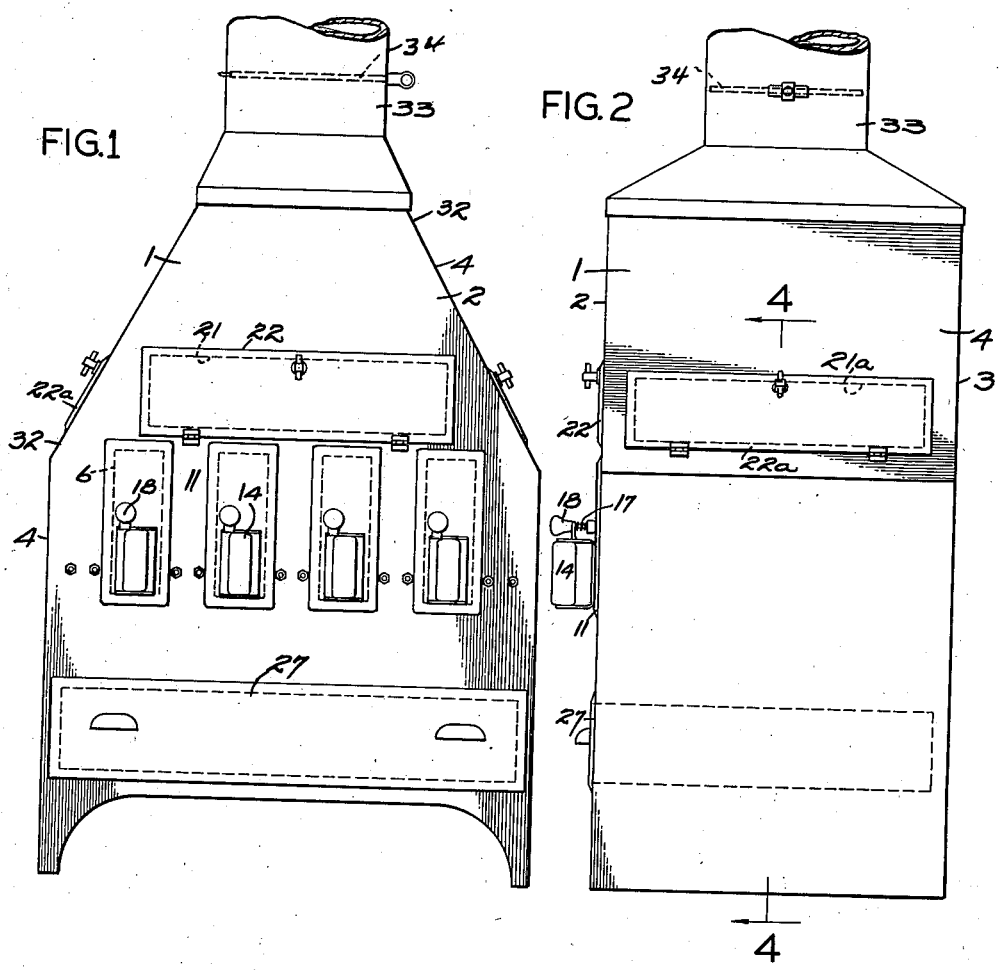
INVENTOR.
Abraham I. Engel
Samuel Greenberg
BY
ATTORNEY

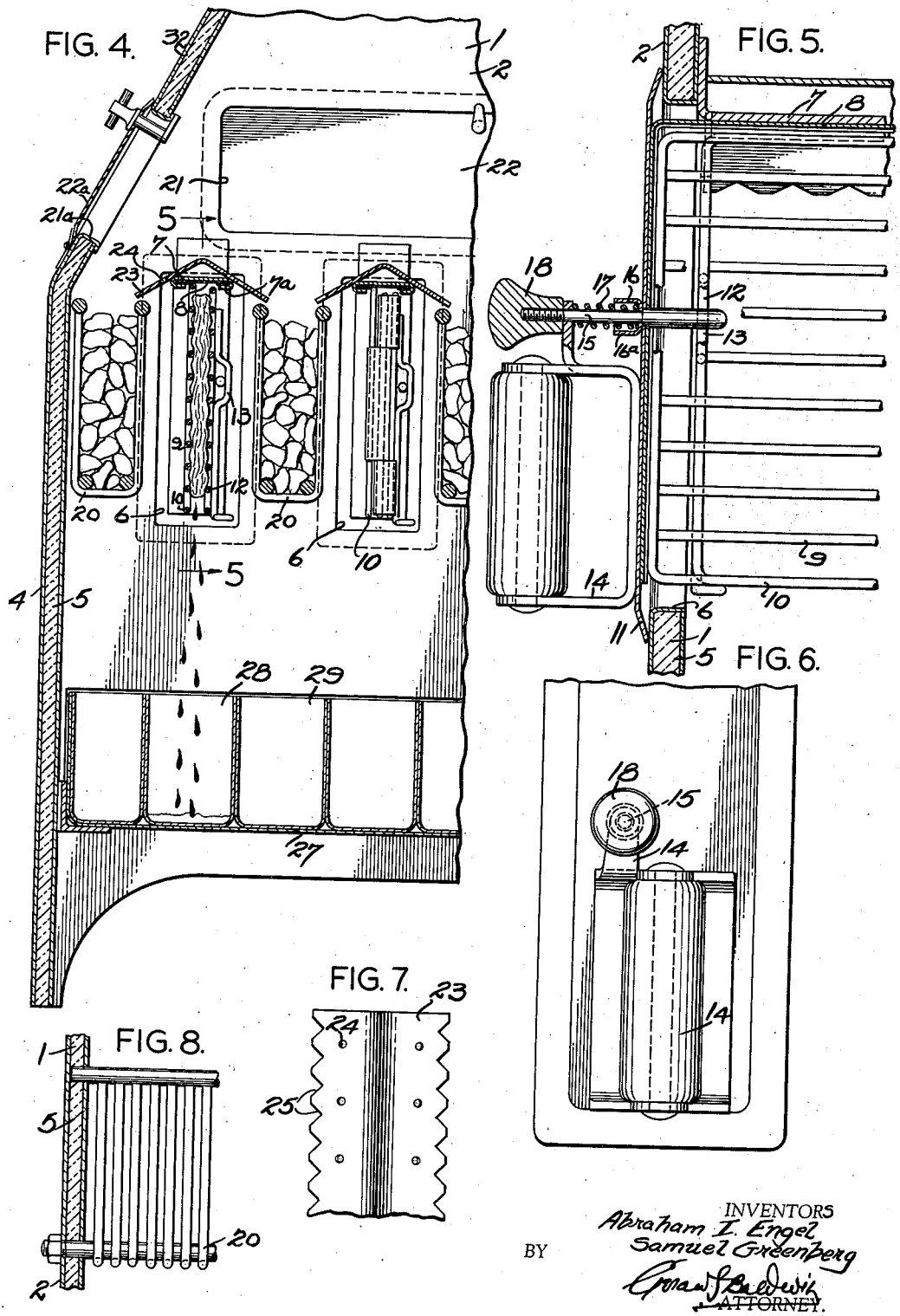
Feb. 9, 1937.   A. I. ENGEL ET AL   2,069,824
COOKING DEVICE
Filed May 1, 1936   2 Sheets-Sheet 2
INVENTORS
Abraham I. Engel
Samuel Greenberg
BY
ATTORNEY Patented Feb. 9, 1937

2,069,824

UNITED STATES PATENT OFFICE 2,069,824

COOKING DEVICE

Abraham I. Engel and Samuel Greenberg, Detroit, Mich., assignors of one-half to Anastas Elioff, Detroit, Mich.

Application May 1, 1936, Serial No. 77,377

3 Claims. (Cl. 126—14)

This invention relates to improvements in cooking devices, and aims, among other things, to provide a simple and inexpensive form of cooking device having a plurality of broilers removably arranged therein each between two opposed heating means.

Another object of the invention is to provide a cooking device wherein improved means are provided for removably mounting a plurality of broilers, each of which is provided with two spaced racks and means for normally holding the latter in spaced relation.

A further object of the invention to provide a cooking device wherein easy access is provided to the heating means so that fuel may be readily inserted; and wherein chutes are provided for preventing fuel intended for the heating means dropping upon the broilers or in the dripping receptacles mounted beneath the latter.

Having thus briefly stated some of the major objects and advantages of the invention, we will now proceed to describe a preferred embodiment thereof with the aid of the accompanying drawings, in which:

Figure 1 illustrates a front elevation of the invention, and

Figure 2 is a side elevation thereof.

Figure 3 is a plan view of one of the broilers.

Figure 4 is an enlarged section on the line 4—4 of Figure 2.

Figure 5 is an enlarged section on the line 5—5 of Figure 4.

Figure 6 is an enlarged front elevation of a portion of a broiler.

Figure 7 is an enlarged plan view of a portion of one of the chutes, and

Figure 8 is an enlarged side view of one end of a fuel basket.

Referring to the drawings, 1 designates a casing having front, rear and side walls 2, 3 and 4 respectively, all of which are usually suitably lined with heat insulating material as shown at 5. Formed through the front wall 2 intermediately of its height are a plurality of openings 6 which are equally spaced from one another. Extending from the front wall 2 to the rear wall 3 within the casing, one substantially centrally of the width of each opening 6, are a plurality of guides 7 having inverted ways 7a. Movable upon and detachable from each guide 7 is a slide 8 which forms a portion of a broiler 9, and in the present instance the latter depends from its slide.

Mounted upon the underside of each slide 8 and extending transversely across the greater portion of the width of the casing 1 is a fixed rack 10.

One extremity of each slide 8 and its rack 10 is mounted upon the inner face of a closure plate 11 which is larger than the opening 6 it is intended to rest against so that when the broilers are in position the openings 6 are closed by the plates 11. Pivotally mounted about a vertical axis upon the extremity of each fixed rack 10 remote from its plate 11 is a movable rack 12 which is intended to rest normally substantially parallel with and spaced from its fixed rack to that opposite sides of food to be cooked may be frictionally held by and between the two racks 10 and 12. The outer or forward extremity of each movable rack 12 has a loop or eye 13 formed thereon, and on the outer side of each plate 11 a handle 14 is provided. Mounted for axial movement through each handle 14, plate 11 and eye 13 is a locking pin 15 having a knob 18 mounted upon its outer extremity to facilitate the outward movement of the pin and also to prevent the outer pin extremity passing inwardly through the handle 14. Fixed around each pin 15 between the plate 11 and the handle 14 is a cup 16 having an annular portion 16a extending towards the said handle. This annular portion 16a receives one extremity of a helical spring 17 the opposite end of which bears against the handle 14. Thus the spring tends at all times to move the pin 15 to its loop or eye engaging position. The cup 16 also limits the outward movement of its pin 15 so that the latter cannot be completely withdrawn from the plate 11.

Supported at their ends upon the front and rear walls 2 and 3 respectively and extending across the entire casing 1 are a plurality of heating means for the broilers which consists in the present case of fuel baskets 20 of substantially U-section and open at the top. These baskets are arranged one between each pair of broilers 9 and one adjacent the outer side of each end broiler, and in horizontal alignment with them so that the heat from the fuel contained in the baskets will cook the food supported in the broilers. Formed through the front wall 2 above the broiler openings 6, and extending substantially the full width of the casing, is a firing opening 21 normally closed by a door 22. In order to facilitate the filling of the end baskets 20 side openings 21a, which are closed by doors 22a, are also formed through the side walls 4.

To protect the broilers 9 and any food that may be in them from dust and dirt during the filling of the fuel baskets 20 a chute 23, in the form of an inverted V is provided upon each of the guides 7. The lower outer extremities of these chutes extend beyond the lateral margins of the guides and terminate adjacent the sides of the fuel baskets into which they are intended to direct the fuel. Suitable arrangement is made for the escape of fumes, gases and the like upwardly from the broilers. In the present instance this is accomplished by providing perforations 24 through the chutes 23 and by forming marginal slots 25 in both sides of the latter.

Mounted in the casing 1 beneath the broilers 9 and the fuel baskets 20 is a drawer 27 divided into a plurality of compartments 28 and 29. In the compartments 28, one of which is located beneath each broiler 9, are dripping receptacles 30, and in the compartments 29, one of which is located beneath each fuel basket 20, are ash receptacles 31.

The sides of the casing 1, towards the top of the latter, are upwardly and inwardly flared as shown at 32 to direct the products of combustion and the cooking fumes to a centrally disposed stack 33 in which a pivoted damper 34 is preferably provided.

While in the foregoing the preferred embodiment of the invention has been described and shown, it is understood that the construction is susceptible to such further alterations and modifications as fall within the scope of the appended claims.

What we claim as our invention and desire to secure by Letters Patent is:

1. A coking device comprising a casing having a plurality of horizontally spaced apertures formed through one side thereof, guides extending across said casing one opposite each aperture, a broiler slidably mounted upon each guide and depending therefrom for passage outwardly through one of the apertures, a plate on the outer extremity of each broiler closing its casing aperture, a plurality of fuel baskets mounted in the casing one between each adjacent pair of broilers and one adjacent the outer side of each of the two end broilers, said fuel baskets being in substantially horizontal alignment with said broilers, means for introducing fuel into said baskets from above, and chutes over the broilers for diverting fuel into the baskets and protecting the broilers.

2. A broiler comprising a slide, a rack mounted thereon in alignment with the slide, a plate on one extremity of the slide and rack, a handle on the outer face of the plate, a movable rack pivoted on the extremity of the first named rack remote from the plate, and a pin axially movable through the handle and plate normally holding the movable rack parallel with the first named rack.

3. A cooking device comprising a casing having a plurality of horizontally spaced apertures formed through one side thereof, guides extending across said casing one opposite each aperture, a broiler dependingly and slidably mounted upon each guide for passage outwardly through one of the apertures, a plate on one extremity of each broiler normally bearing against the outer face of the casing and closing one of the apertures, fuel baskets in said casing one mounted on each side of each broiler, said casing having firing openings formed therein above the broiler apertures, doors for closing the openings, and chutes extending over the guides to deflect fuel into the baskets and to protect the broilers, said chutes being provided with means permitting the escape of fumes from the broilers.

ABRAHAM I. ENGEL.
SAMUEL GREENBERG.